(12) United States Patent
Yu et al.

(10) Patent No.: US 8,034,882 B2
(45) Date of Patent: Oct. 11, 2011

(54) BISCARBAZOL-9-YL-SUBSTITUTED TRIARYLAMINE-CONTAINING POLYMERS AND ELECTRONIC DEVICES

(75) Inventors: Wanglin Yu, Midland, MI (US); Weishi Wu, Midland, MI (US); James J. O'Brien, Midland, MI (US)

(73) Assignee: Sumitomo Chemical Company, Limited, Tokyo (JP)

( * ) Notice: Subject to any disclaimer, the term of this patent is extended or adjusted under 35 U.S.C. 154(b) by 794 days.

(21) Appl. No.: 11/817,463

(22) PCT Filed: Feb. 23, 2006

(86) PCT No.: PCT/US2006/006215
§ 371 (c)(1),
(2), (4) Date: Mar. 11, 2008

(87) PCT Pub. No.: WO2006/096332
PCT Pub. Date: Sep. 14, 2006

(65) Prior Publication Data
US 2008/0265755 A1    Oct. 30, 2008

Related U.S. Application Data

(60) Provisional application No. 60/658,919, filed on Mar. 4, 2005.

(51) Int. Cl.
C08G 73/06 (2006.01)
C08F 283/00 (2006.01)
H01J 1/62 (2006.01)
H01L 29/08 (2006.01)

(52) U.S. Cl. ........ 525/423; 525/417; 428/690; 428/917; 313/504; 313/506; 257/40

(58) Field of Classification Search .................. None
See application file for complete search history.

(56) References Cited

U.S. PATENT DOCUMENTS 4,588,666 A    5/1986 Stolka et al.
(Continued)

FOREIGN PATENT DOCUMENTS
JP    62-264056 A    11/1987

OTHER PUBLICATIONS

A. W. Grice, et al., "High brightness and efficiency blue light-emitting polymer diodes", *Applied Physics Letters*, vol. 73, No. 5, Aug. 3, 1998, pp. 629-631.

(Continued)

*Primary Examiner* — Donald L. Tarazano
*Assistant Examiner* — Camie Thompson
(74) *Attorney, Agent, or Firm* — Sughrue Mion, PLLC

(57) ABSTRACT

A conjugated or partially conjugated polymer including a structural unit of Formula (I); where T is an aryl or heteroaryl group that may be substituted or unsubstituted, or a C1-C24 alkyl group; R1 is alkyl, alkoxy, aryl group, cyano, or F; and a and b are independently selected from 1, 2 or 3. In addition, a composition of Formula (IV); wherein X is a halogen or a boronate group.

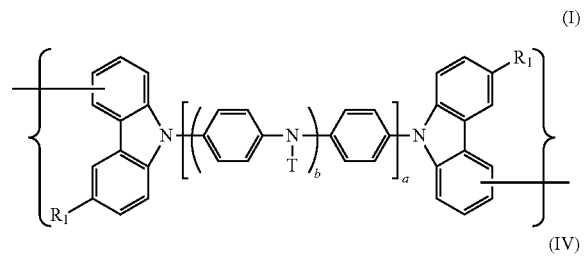

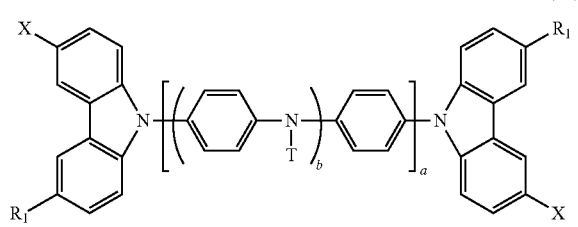

24 Claims, 5 Drawing Sheets

U.S. PATENT DOCUMENTS

| | | | |
|---|---|---|---|
| 5,777,070 | A | 7/1998 | Inbasekaran et al. |
| 5,879,821 | A | 3/1999 | Hsieh |
| 6,169,163 | B1 | 1/2001 | Woo et al. |
| 6,309,763 | B1 | 10/2001 | Woo et al. |
| 6,353,083 | B1 | 3/2002 | Inbasekaran et al. |
| 7,329,722 | B2 * | 2/2008 | Vaitkeviciene et al. ....... 528/423 |
| 7,371,469 | B2 * | 5/2008 | Oshiyama et al. ............ 428/690 |
| 2003/0092880 | A1 | 5/2003 | Leclerc et al. |
| 2004/0127666 | A1 | 7/2004 | Inbasekaran et al. |

OTHER PUBLICATIONS

Yang yang and Qibing Pei, "Efficient blue-green and white light-emitting electrochemical cells based on poly[9,9-bis(3,6-dioxaheptyl)-fluorene-2,7-diyl]", *J. Appl. Phys.*, vol. 81, No. 7, Apr. 1, 1997, pp. 3294-3298.

Mark T. Bernius, et al., "Progress with Light-Emitting Polymers", *Adv. Mater.*, vol. 12, No. 23, Dec. 1, 2000, pp. 1737-1750.

A. R. Katrizky and Zuoquan Wang, "The Synthesis of some Alkylbenzocarbazoles", *J. Heterocyclic Chem.*, vol. 25, Mar.-Apr. 1988, pp. 671-675.

J.K. Luo, et al., "The Synthesis of Isomeric Naphthylethylcarbazole Derivatives as Reference Compounds in Coal-derived Products", *J. Heterocyclic Chem.*, vol. 1213, Sep.-Oct. 1989, pp. 1213-1219.

C.U. Rogers and B.B. Corson, "One-Step Synthesis of 1,2,3,4-Tetrahydrocarb-azole and 1,2-Benzo-3,4-dihydrocarbazole", *Journal of the American Chemical Society*, vol. 69, Nov. 1947, pp. 2910-2911.

M.S. Driver and J.F. Hartwig, "A Second-Generation Catalyst for Aryl Halide Amination: Mixed Secondary Amines from Aryl halides and Primary Amines Catalyzed by (DPPF)PdCl$_2$", *J. Am. Chem. Soc.*, vol. 118, 1996, pp. 7217-7218.

J.P. Wolfe, et al., "An Improved Catalyst System for Aromatic Carbon-Nitrogen Bond Formation: The Possible involvement of Bis(Phosphine) Palladium Complexes as Key Intermediates", *J. Am. Chem. Soc.*, vol. 118, 1996, pp. 7215-7216.

J.P. Wolfe and S.L. Buchwald, "Palladium-Catalyzed Amination of Aryl Iodides", *J. Org. Chem.*, vol. 61, 1996, pp. 1133-1135.

A.S. Guram, et al., "A Simple Catalytic Method for the Conversion of Aryl Bromides to Arylamines", *Angew. Chem. Int. Ed. Engl.*, vol. 34, No. 12, 1995, pp. 1348-1350.

J. Louie and J.F. Hartwig, "Palladium-Catalyzed Synthesis of Arylamines from Aryl Halides. Mechanistic Studies Lead to Coupling in the Absence of Tin Reagents", *Tetrahedron Letters*, vol. 36, No. 21, 1995, pp. 3609-3612.

W.L. Yu, et al., "New efficient blue light emitting polymer for light emitting diodes", *Chem. Commun.*, 1999, pp. 1837-1838.

T. Ishiyama, et al., "Palladium(0)-Catalyzed Cross-Coupling Reaction of Alkoxydiboron with Haloarenes: A Direct Procedure for Arylboronic Esters", *J. Org. Chem.*, vol. 60, 1995, pp. 7508-7510.

\* cited by examiner

BISCARBAZOL-9-YL-SUBSTITUTED TRIARYLAMINE-CONTAINING POLYMERS AND ELECTRONIC DEVICES

This application claims the benefit of the provisional application, U.S. application Ser. No. 60/658,919, filed Mar. 4, 2005, which is incorporated herein by reference.

This invention relates to polymeric compositions comprising biscarbazol-9-yl-substituted triarylamines moieties and electronic devices comprising such compositions.

BACKGROUND

Fluorene based conjugated polymers are known to have interesting optoelectronic properties. Several reports have demonstrated blue light emission from fluorene homopolymers e.g., A. W. Grice; D. D. C. Bradley, M. T. Bernius; M. Inbasekaran, W. Wu, E. P. Woo; *Appl. Phys. Lett.* 1998, 73, Y. Young and Q. Pei; J. Appl. Phys. 81, 3294 (1997). By incorporating different aromatic functional groups into the polymer chain, fluorene-based conjugated polymers have demonstrated different emissive colors with the emissive spectra spanning the entire visible range (400-700 nm) (M. T. Bernius, M. Inbasekaran, J. O'Brien, W. Wu, *Adv. Mater.* 2000, 12, 1737). Efficient and stable electroluminescence needs efficient injection of holes and electrons into a light-emitting polymer layer from anode and cathode, respectively. Due to the energy mismatch between the highest occupied molecular orbital (HOMO) of fluorene homopolymers and the work function of the anode (ITO), the hole-injection of fluorene homopolymers is inefficient. U.S. Pat. Nos. 6,309,763, 6,353,083 and 5,879,821 teach the incorporation of tri-arylamines into fluorene-based polymers as hole-transporting moieties to improve the electroluminescent properties of fluorene-based polymers. US 2004127666 further discovered that the inclusion of tricyclic arylamine in the main chain of a fluorene-based optoelectronic polymer provides further improved conductivity at low voltages as well as higher device efficiency compared to polyfluorenes having other charge transporting groups such as acyclic triarylamines as stated in U.S. Pat. No. 6,353,083.

A need remains for discovering new aromatic amine monomers to develop optoelectronic materials and devices that exhibit improved efficiency and lifetime, and emit light in a variety of colors. Of special interest is a need to discover new aromatic amines that are suitable to be incorporated into fluorene-based polymers to offer deeper blue emission with good hole-injection and hole-transporting properties. It still remains a challenge to design an aromatic amine with wide HOMO-LUMO bandgap (>2.9 eV) to enable a deep blue emission while at the same time to keep the HOMO level to be shallow (close to −5.0 eV) to facilitate hole-injection from anode in a light-emitting device.

SUMMARY OF THE INVENTION

The present invention is directed to a new biscarbazole-9-yl-substituted triarylamine monomer and an optoelectronic polymer which comprises a biscarbazol-9-yl-substituted triarylamine moiety in the main chain of the polymer to enable emission of deep blue light and good hole injection and hole transporting properties.

More specifically, one embodiment of the instant invention is a conjugated or partially conjugated polymer comprising a structural unit of Formula I in the backbone:

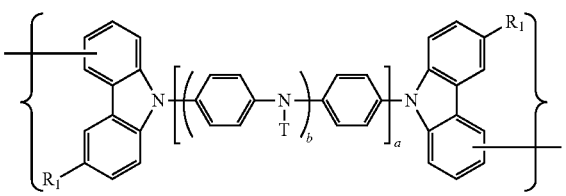

wherein T is an aryl or heteroaryl group that may be substituted or unsubstituted, or a C1-C24 alkyl group; $R_1$ is alkyl, alkoxy, aryl group, cyano, or F; and a and b are independently selected from 1, 2 or 3.

In another aspect, the invention is a film comprising a polymer comprising Formula I. In another embodiment, the invention is a blend of a polymer comprising Formula I with at least one additional polymer. In another embodiment, the invention is an electroluminescent device comprising a film comprising a polymer comprising Formula I. In another embodiment, the invention is a photocell comprising a first electrode, a film comprising a polymer comprising Formula I and a second electrode.

In another aspect, the invention is a field effect transistor comprising: (a) an insulator layer, the insulator layer being an electrical insulator, the insulator layer having a first side and a second side; (b) a gate, the gate being an electrical conductor, the gate being positioned adjacent the first side of the insulator layer; (c) a semiconductor layer, the semiconductor layer comprising a polymer comprising Formula I and a second electrode; (d) a source, the source being an electrical conductor, the source being in electrical contact with the first end of the semiconductor layer; and (e) a drain, the drain being an electrical conductor, the drain being in electrical contact with the second end of the semiconductor layer.

In another embodiment, the invention is a composition of Formula IV

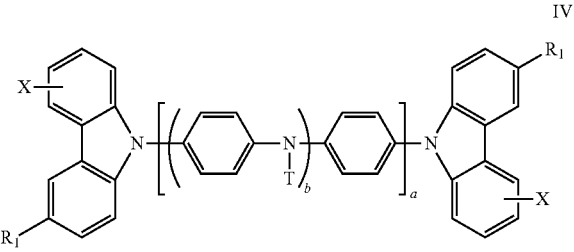

wherein T is an aryl or heteroaryl group that may be substituted or unsubstituted, or a C1-C24 alkyl group; $R_1$ is alkyl, alkoxy, aryl-substituted group, cyano, or F; a and b are independently selected from 1, 2 or 3; and X is a leaving group such as halogen, boronic acid or boronate ester.

DETAILED DESCRIPTION OF THE INVENTION

Figure 1:
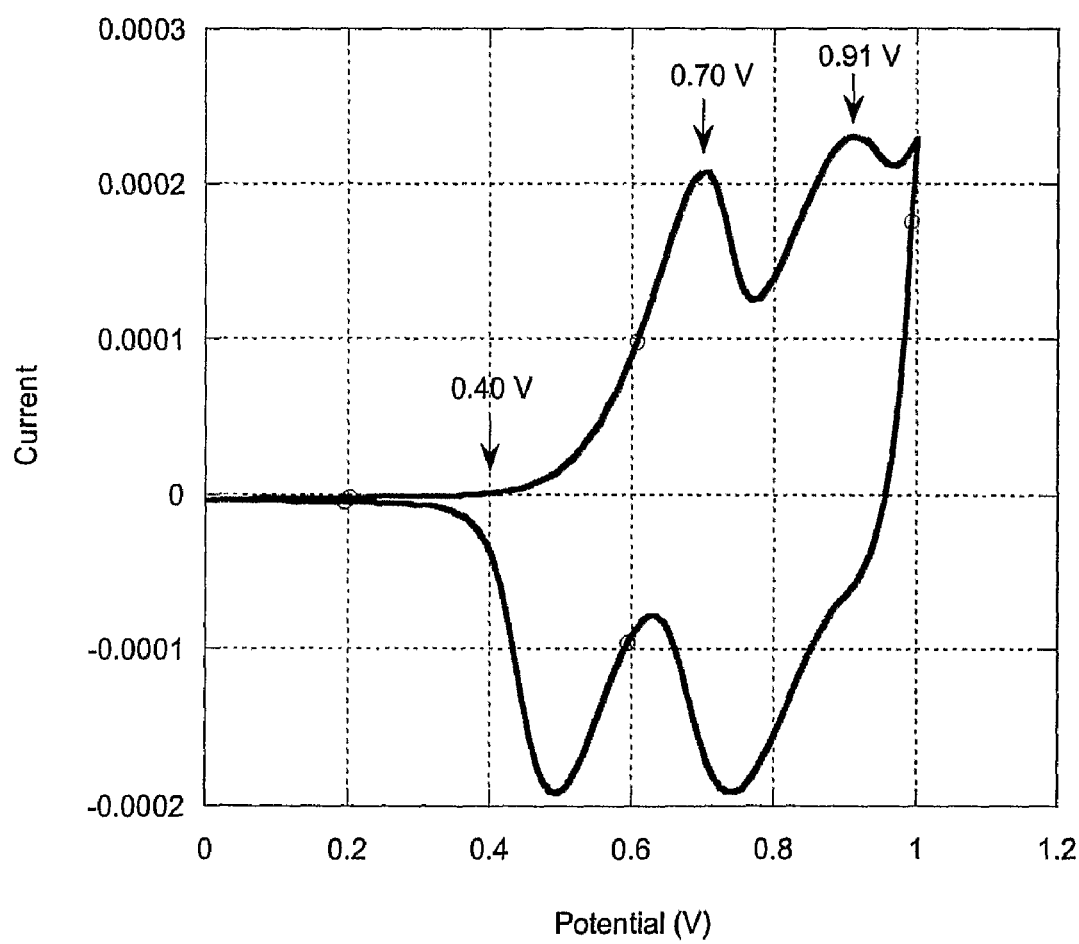
FIG. 1 shows the cyclic voltammogram of Polymer 1.

The instant invention is a conjugated or partially conjugated polymer comprising a structural unit of Formula I:

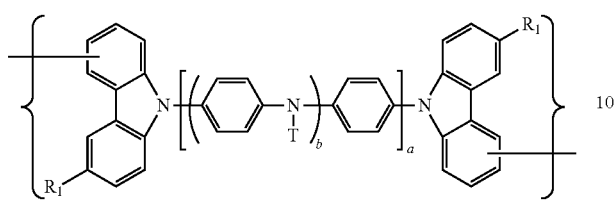

wherein T is an aryl or heteroaryl group that may be substituted or unsubstituted, or a $C_1$-$C_{24}$ alkyl group; $R_1$ is alkyl, alkoxy, aryl group, cyano, or F; and a and b are independently selected from 1, 2 or 3. T is preferably an alkyl group or an aromatic group which optionally contain one or more heteroatoms, which groups are optionally fused by one or more aromatic or non-aromatic rings, and which groups are optionally substituted or unsubstituted. More preferably, T is an aromatic moiety selected from the group consisting of phenyl, biphenyl, fluorenyl, thiophenyl, furanyl, pyrrolyl, pyridinyl, naphthalenyl, anthracenyl, phenanthrenyl, tetracenyl, perylenyl, quinolinyl, isoquinolinyl, quinazolinyl, phenanthridenyl, phenanthrolinyl, phenazinyl, acridinyl, dibenzosilolyl, phthalazinyl, cinnolinyl, quinoxalinyl, benzoxazolyl, benzimidazolyl, benzothiophenyl, benzothiazolyl, carbazolyl, benzoxadiazolyl, benzothiadiazolyl, thieno[3,4-b]pyrazinyl, [1,2,5]thiadiazolo[3,4-g]-quinoxalinyl, benzo[1,2-c;3-4-c']bis[1,2,5]-thiadiazolyl, pyrazino[2,3-g]quinoxalinyl, benzofuranyl, indolyl, dibenzofuranyl, dibenzothiophenyl, thianthrenyl, benzodioxinyl, benzodioxanyl, dibenzodioxinyl, phenazinyl, phenoxathiinyl, benzodithiinyl, benzodioxolyl, benzocyclobutenyl, dihydrobenzodithiinyl, dihydrothienodioxinyl, chromanyl, isochromanyl, 9,10-dihydrophenanthrenyl, thiazinyl, phenoxazinyl, isoindolyl, dibenzothiophenesulfonyl, and phenothiazinyl. Even more preferably, T is a substituted or unsubstituted phenyl, biphenyl, fluorenyl, carbazolyl, phenoxazinyl, or phenothiazinyl. Yet even more preferably, T is a substituted phenyl moiety.

$R_1$ is independently, alkyl, alkoxyl, aryl group, cyano, or F. More preferably, $R_1$ is a $C_1$-$C_{20}$ alkyl group, a carbo-$C_1$-$C_{20}$-alkoxy group, a $C_1$-$C_{20}$-alkoxy group, which optionally contains one or more heteroatoms, such as O, S, N, Si, and in which one or more hydrogen atoms may be replaced by F, or aromatic groups, or a $C_6$-$C_{40}$ aryl group which optionally is further substituted and which optionally contains one or more heteroatoms. Preferably, $R_1$ is methyl, ethyl, propyl, butyl, methoxy, ethoxy, propoxy, butoxy, phenyl, or tolyl.

The composition of the instant invention comprises a conjugated or partially conjugated polymer comprising a structural unit of Formula II where x is the fraction of the structural unit shown by Formula I and y is the fraction of all other structural units, and x+y=1 or y=1-x, and x=0.001-1 and Z is an aromatic group or a combination of two or more aromatic groups independently selected from the group of formulas:

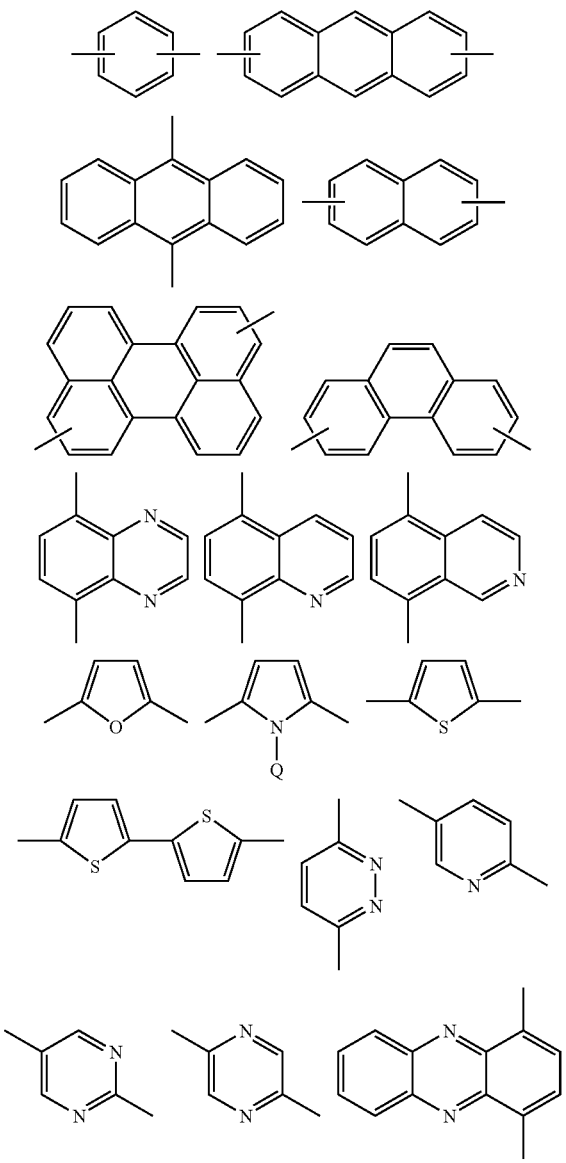

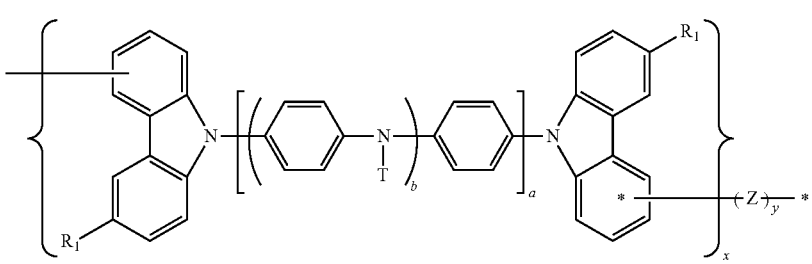

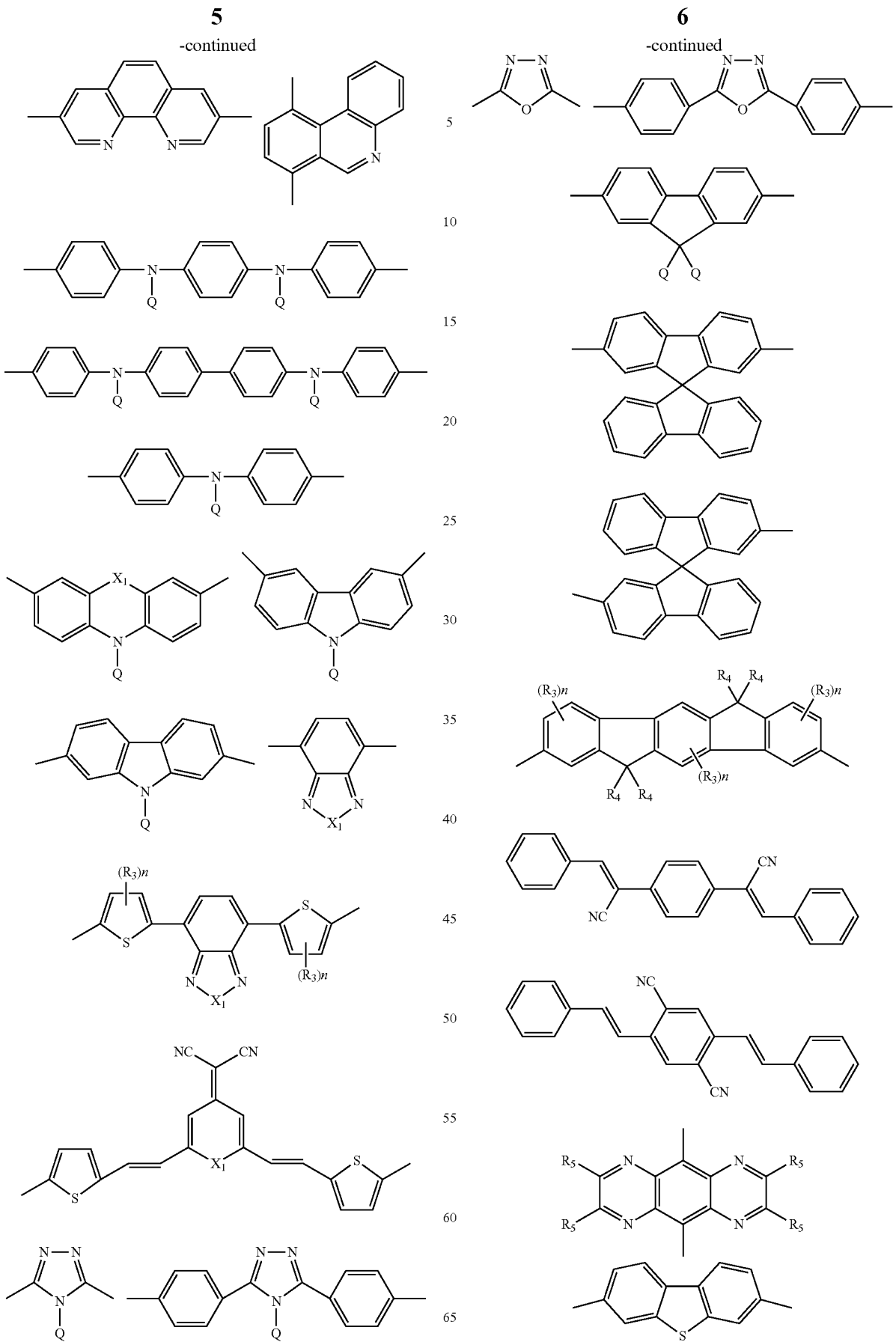

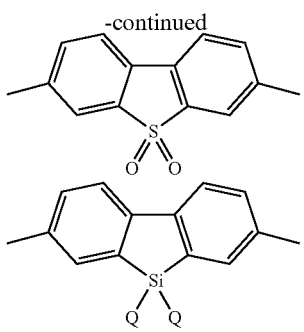

wherein the conjugated units may bear one or more substitutents, such substituents being independently, in each occurrence, $C_{1-20}$ hydrocarbyl, $C_{1-20}$ hydrocarboxyloxy, $C_{1-20}$ thioether, $C_{1-20}$ hydrocarbyloxycarbonyl, $C_{1-20}$ hydrocarboxycarbonyloxy, cyano, or fluoro group;

$X_1$ is O or S;

Q is $R_2$ or Ar;

Ar is an aryl or heteroaryl group of $C_4$ to $C_{40}$ or substituted aryl or heteroaryl group of $C_4$ to $C_{40}$; $R_2$ is independently, in each occurrence, H, $C_{1-40}$ hydrocarbyl or $C_{3-40}$ hydrocarbyl containing one or more S, N, O, P or Si atoms (a heteroatom may be incorporated into the carbon-carbon bond or may replace a hydrogen atom as a substituent), or both of $R_2$ together with the 9-carbon on the fluorene may form a $C_{5-20}$ ring structure that may contain one or more S, N, Si, P or O atoms; $R_3$ is independently, in each occurrence, $C_{1-20}$ hydrocarbyl, $C_{1-20}$ hydrocarbyloxy, $C_{1-20}$ thioether, $C_{1-20}$ hydrocarbyloxycarbonyl, $C_{1-20}$ hydrocarbylcarbonyloxy, cyano or fluoro group; $R_4$ is independently, in each occurrence, H, $C_{1-40}$ hydrocarbyl or $C_{3-40}$ hydrocarbyl containing one or more S, N, O, P or Si atoms, or both of $R_4$ together with the 9-carbon on the fluorene may form a $C_{5-20}$ ring structure that may contain one or more S, N, Si, P or O atoms; $R_5$ is independently, in each occurrence, H, $C_{1-40}$ hydrocarbyl or $C_{3-40}$ hydrocarbyl containing one or more S, N, O, P or Si atoms; n is independently, in each occurrence, 0-3.

Both of $R_6$ together with the 9-carbon on the fluorene may form a $C_{5-20}$ ring structure that may contain one or more S, N, Si, P or O atoms.

In this embodiment, $R_6$ preferably has the formula

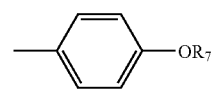

where $R_7$ is a $C_1$-$C_{20}$ alkyl group optionally containing one or more heteroatoms.

The instant invention includes an electroluminescent device comprising at least one organic film comprising a polymer of the instant invention, arranged between an anode material and a cathode material such that under an applied voltage, the organic film emits light which is transmitted through a transparent exterior portion of the device.

The instant invention is also a field effect transistor comprising: (a) an insulator layer, the insulator layer being an electrical insulator, the insulator layer having a first side and a second side; (b) a gate, the gate being an electrical conductor, the gate being positioned adjacent the first side of the insulator layer; (c) a semiconductor layer, the semiconductor layer comprising the polymer comprising Formula I and a second electrode; (d) a source, the source being an electrical conductor, the source being in electrical contact with the first end of the semiconductor layer; and (e) a drain, the drain being an electrical conductor, the drain being in electrical contact with the second end of the semiconductor layer. The instant invention also includes a photocell comprising a first electrode, a film comprising a polymer of the instant invention and a second electrode.

The composition of the instant invention comprises a conjugated or partially conjugated polymer comprising a structural unit of Formula III

III

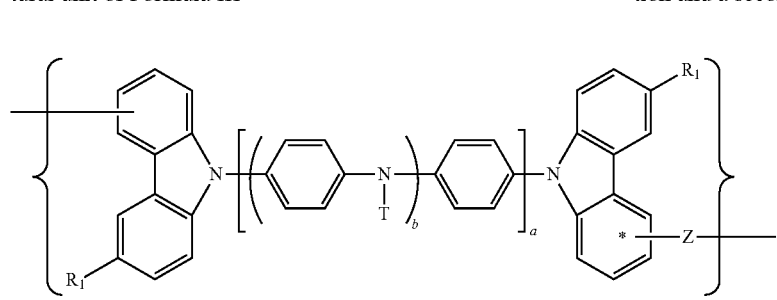

wherein Z is the same as mentioned above.

In this embodiment, Z preferably has the formula

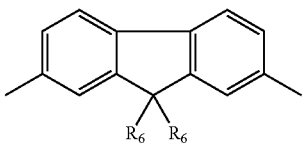

where $R_6$ is independently $C_4$-$C_{20}$-alkyl, $C_4$-$C_{20}$-alkoxy, $C_7$-$C_{20}$-alkylphenyl, $C_7$-$C_{20}$-alkyloxyphenyl, or $C_6$-$C_{40}$-aryl.

The instant invention is also a composition of Formula IV

IV

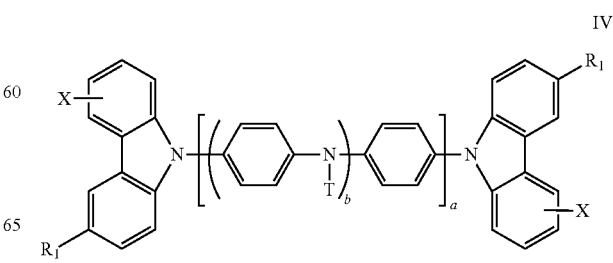

wherein T is an aryl or heteroaryl group that may be substituted or unsubstituted, or a $C_1$-$C_{24}$ alkyl group, $R_1$ is alkyl, alkoxy, aryl-substituted group, cyano, or F, and a and b are independently selected from 1, 2 or 3. Preferably, X is bromine.

The polymers of the invention have a weight average molecular weight of about 10,000 Daltons or greater, 20,000 Daltons or greater, or preferably 50,000 Daltons or greater; 1,000,000 Daltons or less, 500,000 Daltons or less, and preferably 400,000 Daltons or less. Molecular weights are determined using gel permeation chromatography using polystyrene as an internal standard.

Preferably, the polymers demonstrate a polydispersity (Mw/Mn) of 10 or less, 5 or less, 4 or less and preferably 3 or less.

The polymers of this invention may be assembled by any known coupling reaction for making aromatic compounds. Preferably, the Suzuki coupling reaction is used. The Suzuki reaction couples aromatic compounds using a diboronated aromatic moiety and a dihalogenated aromatic moiety. The reaction allows for the creation of long chain, high molecular weight polymers. Additionally, by controlling the sequence of addition, either random or block copolymers may be produced.

Preferably, the Suzuki reaction starts with a diboronated monomer. The Suzuki process is taught in U.S. Pat. No. 5,777,070, which is expressly incorporated herein by reference.

Toluene or xylenes are the preferred solvents for the Suzuki reaction to prepare the polymers of the instant invention. Sodium carbonate in water is the preferred base, a palladium complex catalyst, such as tetrakis(triphenylphosphine)palladium or dichlorobis(triphenylphosphine)palladium(II) is the preferred catalyst, and a phase transfer catalyst, preferably, a quaternary ammonium salt is used to speed up the reaction for achieving high molecular weight in a short period of time.

A general synthetic route is outlined in the scheme outlined on the following page to illustrate the synthetic art of a monomer of Formula II of the instant invention. Starting materials for synthesizing the monomer(s) of Formula II of the instant invention are commercially available from many commercial vendors such as Aldrich Chemical Company. In the route shown, Y is a halogen atom and a, b, $R_1$, T and X are defined as above.

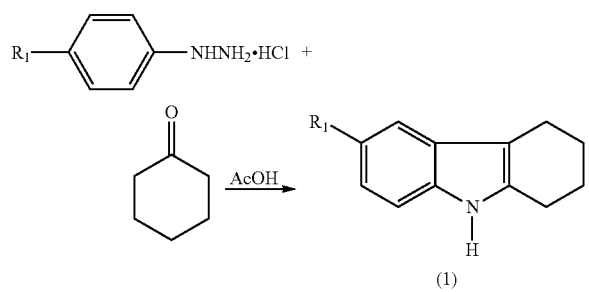

3-Substituted-9-H-carbazoles (3) may be prepared following a literature procedure (A. R. Katritzky and Z. Wang, Journal of Heterocyclic Chemistry, 25, 671, (1988); J.-K Luo, R. N. Castle, M. L. Lee, Journal of Heterocyclic Chemistry, 26, 1213, (1989); Crosby U. Rogers and B. B. Corson, Journal of the American Chemical Society, 69, 2910) starting from a para-substituted or unsubstituted phenylhydrazine hydrohalogenide salt and cyclohexanone or a substituted cyclohexanone. For example, p-tolylhydrazine hydrochloride reacts with cyclohexanone in boiling glacial acetic acid to produce 1,2,3,4-tetrahydro-6-methylcarbazole. The dehydrogenation of 1,2,3,4-tetrahydro-6-methylcarbazole catalyzed by palladium on charcoal at elevated temperatures generates 3-methyl-9-H-carbazole as one example of compound (3). 3-methyl-9-H-carbazole can also be prepared starting from phenylhydrazine hydrochloride and 4-methyl-cyclohexanone using the similar reactions, in which the intermediate compound (2) is 1,2,3,4-tetrahydro-3-methylcarbazole. A bis (3-substitute-carbazolyl)aromatic amine (5) can be prepared by reacting a compound (3) with a dihalogenated aromatic amine compound (4), preferably a dihalogenated triaryl amine, such as 4,4'-dibromo-4"-sec-butyltriphenylamine, N,N'-di(p-bromophenyl)-N,N'-di(p-butylphenyl)-1,4-phenylenediamine, as disclosed in U.S. Pat. No. 6,353,083, through a C—N coupling reaction. Useful C—N coupling reactions include and are not limited to Ullmann reaction (U.S. Pat. No. 4,588,666) and palladium-catalyzed cross coupling reactions (M. S. Driver, J. F. Hartwig, Journal of the American Chemical Society, 118, 7217 (1996); J. P. Wolfe, S. Wagaw, S. L. Buchwald, Journal of the American Chemical Society, 118, 7215 (1996); J. P. Wolfe and S. L. Buchwald, Journal of Organic Chemistry, 61, 1133 (1996); A. S. Guran, R. A. Rennels, S. L. Buchwald, Angew. Chem. Int. Ed. Engl., 34, 1348 (1995); J. Louie, J. F. Hartwig, Tetrahedron Lett., 36, 3609 (1995)). A dihalogenated monomer of compound (6) can be prepared by treating a compound (5) with a halogenation reagent, such as N-bromosuccinimide (NBS), N-iodosuccinimide (NIS) or bromine. A dihalogenated monomer of compound (6) may be further converted to a diboronate monomer using known art (U.S. Pat. No. 6,169,163; W.-L. Yu, J. Pei, Y. Cao, A. J. Heeger, Chemical Communications, 1837 (1999); T. Tshiyama, M. Murata, N. Miyaura, Journal of Organic Chemistry, 60, 7508 (1995)).

Another aspect of this invention is related to polymer blends. The blends comprise a polymer containing structural units chosen from Formulas I-III blended with at least one other polymer, preferably a conjugated or partially conjugated polymer. As used herein, the term "conjugated polymer" means a polymer with a backbone of overlapping π orbitals. Conjugated polymers that may be used in the blends include polyfluorenes, poly(arylenevinylene), polyphenylenes, polyindenofluorenes and polythiophenes, including homopolymers, co-polymers or substituted homopolymers and/or copolymers of any of these conjugated polymers.

Preferably, the polymer blend is composed of at least 1 weight percent of a polymer containing units chosen from Formulas I-III. The most preferred polymer blends have high photoluminescent and electroluminescent efficiency. Other additives such as viscosity modifiers, antioxidants and coating improvers may optionally be added. Additionally, blends of two or more low polydispersity polymers of similar compositions but different molecular weight can also be formulated.

Another aspect of this invention is the films formed from the polymers of the invention. Such films can be used in polymeric light emitting diodes, photovoltaic cells and field effect transistors. Preferably, such films are used as emitting layers or charge carrier injection or transport layers. The films may also be used as protective coatings for electronic devices and as fluorescent coatings. The thickness of the film or coating is dependent upon the use.

Generally, such thickness can be from 0.005 to 200 microns. When the coating is used as a fluorescent coating, the coating or film thickness is from 50 to 200 microns. When the coatings are used as electronic protective layers, the thickness of the coating can be from 5 to 20 microns. When the coatings are used in a polymeric light-emitting diode, the thickness of the layer formed is 0.005 to 0.2 microns.

The films are readily formed by coating the polymer composition from another embodiment of this invention in which the composition comprises the polymer and at least one organic solvent. Preferred solvents are aliphatic hydrocarbons, chlorinated hydrocarbons, aromatic hydrocarbons, ketones, ethers and mixtures thereof. Additional solvents which can be used include 1,2,4-trimethylbenzene, 1,2,3,4-tetramethyl benzene, pentylbenzene, mesitylene, cumene, cymene, cyclohexylbenzene, diethylbenzene, tetralin, decalin, 2,6-lutidine, 2-fluoro-m-xylene, 3-fluoro-o-xylene, 2-chlorobenzotrifluoride, dimethylformamide, 2-chloro-6-fluorotoluene, 2-fluoroanisole, anisole, 2,3-dimethylpyrazine, 4-fluoroanisole, 3-fluoroanisole, 3-trifluoro-methylanisole, 2-methylanisole, phenetole, 4-methylanisole, 3-methylanisole, 4-fluoro-3-methylanisole, 2-fluorobenzonitrile, 4-fluoroveratrol, 2,6-dimethylanisole, 3-fluorobenzonitrile, 2,5-dimethylanisole, 2,4-dimethylanisole, benzonitrile, 3,5-dimethylanisole, N,N-dimethylaniline, ethyl benzoate, 1-fluoro-3,5-dimethoxybenzene, 1-methylnaphthalene, N-methylpyrrolidinone, 3-fluorobenzotrifluoride, benzotrifluoride, benzotrifluoride, dioxane, trifluoromethoxybenzene, 4-fluorobenzotrifluoride, 3-fluoropyridine, toluene, 2-fluorotoluene, 2-fluorobenzotrifluoride, 3-fluorotoluene, 4-isopropylbiphenyl, phenyl ether, pyridine, 4-fluorotoluene, 2,5-difluorotoluene, 1-chloro-2,4-difluorobenzene, 2-fluoropyridine, 3-chlorofluorobenzene, 3-chlorofluorobenzene, 1-chloro-2,5-difluorobenzene, 4-chlorofluorobenzene, chlorobenzene, o-dichlorobenzene, 2-chlorofluorobenzene, p-xylene, m-xylene, o-xylene or mixture of o-, m-, and p-isomers. It is preferable that such solvents have relatively low polarity. High boilers and solvent mixtures are better for ink jetting, but xylenes and toluene are best for spin coating. Preferably, the solution contains from about 0.1 to 5 percent of a polymer comprising a structural unit chosen from Formulas I-III. Films can be prepared by means well known in the art including spin-coating, spray-coating, dip-coating, roll-coating, offset printing, ink jet printing, screen printing, stamp-coating or doctor blading.

In a preferred embodiment, the invention is a composition comprising a polymer or polymer blend of the invention in a solvent. Solvents which can be used include toluene, xylene, a mixture of o, m and p-isomers of xylene, mesitylene, diethylbenzene, ethylbenzene or benzene derivatives of higher substituted level. Preferably, the solution contains from 0.1 to 10 weight percent of the composition. For thin coatings, it is preferred that the composition contains from 0.5 to 5.0 percent by weight of the composition. The composition is applied to the appropriate substrate by the desired method and the solvent is allowed to evaporate. Residual solvent may be removed by vacuum, heat and/or by sweeping with an inert gas such as nitrogen.

The polymers of this invention demonstrate strong electroluminesence in addition to photoluminesence. Thus, another aspect of the invention relates to organic electroluminescent (EL) devices having a film comprising the polymers of this invention. Preferably, the EL devices of this invention emit light when subjected to an applied voltage of 20 volts or less, 10 volts or less and preferably 6 volts or less.

An organic EL device typically consists of an organic film sandwiched between an anode and a cathode. When a positive bias is applied to the device, holes are injected into the organic film from the anode, and electrons are injected into the organic film from the cathode. The combination of a hole and an electron may give rise to an exciton that may undergo radiative decay to the ground state by liberating a photon.

In practice, the anode is commonly a mixed oxide of tin and indium for its conductivity and transparency. The mixed oxide (ITO) is deposited on a transparent substrate such as glass or plastic so that the light emitted by the organic film may be observed. The organic film may be the composite of several individual layers each designed for a distinct function. Because holes are injected from the anode, the layer next to the anode should have the functionality of transporting holes. Similarly, the layer next to the cathode should have the functionality of transporting electrons. In many instances, the electron or hole transporting layer may also act as the emitting layer. In some instances, a single layer may perform the combined functions of hole and electron transport and light emission.

The metallic cathode may be deposited either by thermal evaporation or by sputtering. The thickness of the cathode may be from 1 nm to 1000 nm. The preferred metals are calcium, magnesium, indium, aluminum and barium. A thin layer (1-10 nm) of an alkali or alkaline metal halide, e.g., LiF, NaF, CsF or RbF, may be used as a buffering layer between the light emitting polymer and the cathode, calcium, barium, or magnesium. Alloys of these metals may also be used. Alloys of aluminum containing 1 to 5 percent of lithium and alloys of magnesium containing at least 80 percent of magnesium are preferred.

In a preferred embodiment, the electroluminescent device comprises at least one hole injecting polymer film (PEDOT film, for example) and a light-emitting polymer film comprised of the composition of the invention, arranged between an anode material and a cathode material such that under an applied voltage, holes are injected from the anode material into the light emitting polymer via the hole-injecting polymer film and electrons are injected from the cathode material into the light-emitting polymer film when the device is forward biased, resulting in light emission from the light-emitting layer. In another preferred embodiment, layers of hole-transporting polymers are arranged so that the layer closest to the anode has the lowest oxidation potential, with the adjacent layers having progressively higher oxidation potentials. By these methods, electroluminescent devices having relatively high light output per unit voltage may be prepared.

Another embodiment of the invention relates to photocells comprising one or more of the polymers of the invention wherein the polymers are present as single-layer films or as multiple-layer films, whose combined thickness is in the range of 10 nm to 1000 nm, in the range of 25 nm to 500 nm, preferably in the range of 50 nm to 300 nm. When two or more polymers are used, they may be deposited separately as distinct layers or deposited as one layer from a solution containing a blend of the desired polymers.

"Photocells" mean a class of optoelectronic devices that can convert incident light energy into electrical energy. Examples of photocells are photovoltaic devices, solar cells, photodiodes, and photodetectors. A photocell generally comprises a transparent or semi-transparent first electrode deposited on a transparent substrate. A polymer film is then formed onto the first electrode that is, in turn, coated by a second electrode. Incident light transmitted through the substrate and the first electrode is converted by the polymer film into excitons that can dissociate into electrons and holes under the appropriate circumstances, thus, generating an electric current.

Another embodiment of the invention relates to metal-insulator-semiconductor field effect transistors comprising one or more of the polymers of the invention which serve as a semiconducting polymer. A field effect transistor comprises five elements. The first element is an insulator layer. The insulator layer is an electrical insulator, having a first side and a second side. The second element is a gate. The gate is an electrical conductor. The gate is positioned adjacent the first side of the insulator layer.

The third element is a semiconductor layer. The semiconductor layer comprises a polymer comprising a structural unit chosen from Formulas I-III above. The semiconductor layer has a first side, a second side, a first end and a second end, the second side of the semiconductor layer being adjacent to the second side of the insulator layer. The polymer is deposited onto an insulator wherein the polymers are present as single-layer films or as multiple-layer films whose combined thickness is in the range of 10 nm to 1000 nm, in the range of 25 nm to 500 nm, preferably in the range of 50 nm to 300 nm.

The fourth element of a field effect transistor is a source. The source is an electrical conductor. The source is in electrical contact with the first end of the semiconductor layer. The fifth element is a drain. The drain is an electrical conductor. The drain is in electrical contact with the second end of the semiconductor layer. A negative voltage bias applied to the gate causes the formation of a hole conduction channel in the semiconductor layer connecting the source to the drain. A positive bias applied to the gate causes the formation of an electron-conducting channel in the semiconductor layer.

As with electroluminescent devices, the polymer films comprising the semiconductor layer may be formed by solvent-based processing techniques such as spin-coating, roller-coating, dip-coating, spray-coating and doctor-blading and ink jet printing. When two or more polymers are used, they may be deposited separately as distinct layers or deposited as one layer from a solution containing a blend of the desired polymers.

Two electrodes (source and drain) are attached to the semi-conducting polymer and a third electrode (gate) onto the opposite surface of the insulator. If the semiconducting polymer is hole transporting (i.e, the majority carriers are positive holes), then applying a negative DC voltage to the gate electrode induces an accumulation of holes near the polymer-insulator interface, creating a conduction channel through which electric current can flow between the source and the drain. The transistor is in the "on" state. Reversing the gate voltage causes a depletion of holes in the accumulation zone and cessation of current. The transistor is in the "off" state.

EXAMPLES

The following examples are included for illustrative purpose and do not limit the scope of the claims.

Reaction Scheme:

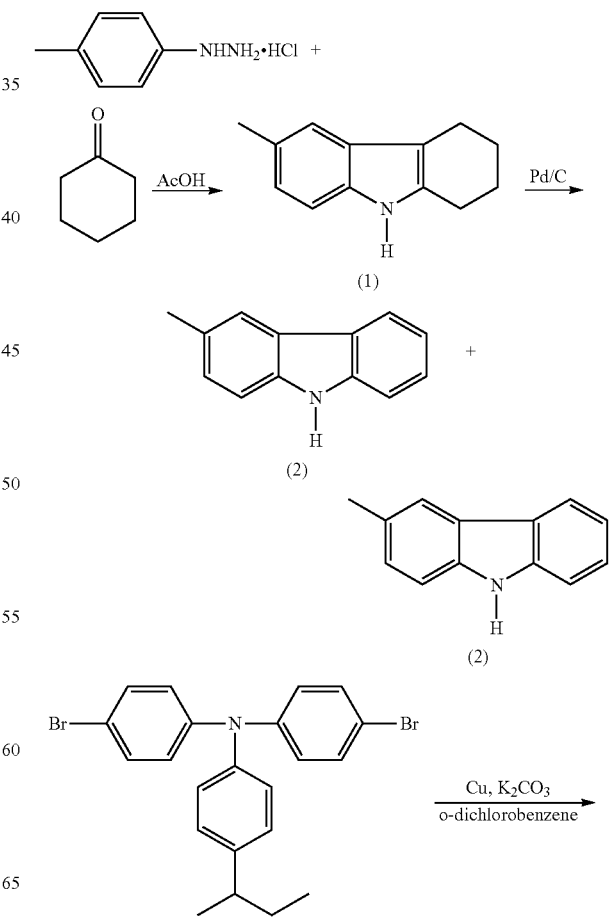

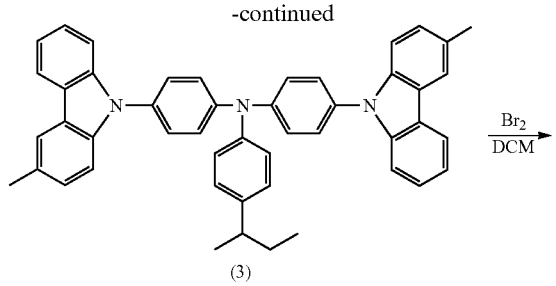

(3)

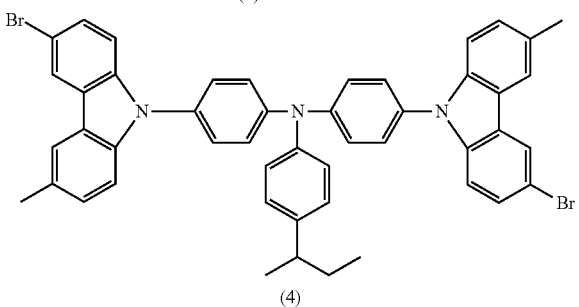

(4)

Synthesis of 1,2,3,4-Tetrahydro-6-methylcarbazole

Compound 1

Cyclohexanone (49.1 g, 0.5 moles) and glacial acetic acid (180 g) are charged into a 1L 3-neck round bottom flask (RBF). The solution is heated to reflux. p-Tolylhydrazine hydrochloride (79.3 g, 0.3 moles) is added under reflux during a period of 1 hour. After the addition of p-tolylhydrazine hydrochloride, the reflux is continued for another 3 hours under nitrogen. The heating source is removed and the reaction mixture is cooled and then filtered. The solids are washed with water and then with 300 mL of 75% methanol. The crude product is obtained by filtration as off-white crystals. The crude product is purified by re-crystallization from methanol to give 70 g of colorless needle crystals as the final product. HPLC indicates a purity of essentially 100 wt %.

Synthesis of 3-Methylcarbazole

Compound 2

1,2,3,4-Tetrahydro-6-methylcarbazole (Compound 1) (35 g) and 5% palladium charcoal (12 g) in a 1L RBF are heated at 260° C. under nitrogen for 1.5 hour. After cooling down to room temperature, THF is added to dissolve the compounds. The charcoal and Pd are removed by filtration. THF is removed and then the crude product is re-crystallized from ethanol twice. 25.9 g of the final product is obtained as white crystals. HPLC indicates a purity of 99.5 wt %.

Synthesis of 4,4'-Bis(3-methylcarbazol-9-yl)-4"-sec-butyltriphenylamine

Compound 3

8.14 g (45 mmol) of 3-methylcarbazole (Compound 2), 6.9 g (15 mmol) of 4,4'-dibromo-4"-sec-butyltriphenylamine, 7.1 g (110.4 mmol) of copper, 30.4 g (0.22 mol) of potassium carbonate, and 1.45 g (5.5 mmol) of 18-crown-6 are dispersed in 250 mL of o-dichlorobenzene under nitrogen in a 500 mL 3-neck RBF equipped with condenser and Dean Stark trap. The suspension is degassed with nitrogen for 15 minutes and then is heated to reflux under nitrogen for 5 days. The water generated during the reaction is removed through the Dean Stark trap. After the reaction is cooled to near room temperature, the reaction mixture is filtered through a basic alumina bed (~2 cm thick) and eluted with toluene. The solvents are removed on a rotary evaporator under reduced pressure to give white solid as the crude product. The product is purified by column chromatography on silica gel eluted with a mixture of hexane and toluene (3:1 in volume) and further purified by recrystallization from a mixture of acetonitrile and toluene. 6.8 g of the final product is obtained as white solids having a purity of 99.5% as indicated by HPLC.

Synthesis of 4,4'-Bis(3-bromo-6-methylcarbazol-9-yl)-4"-sec-butyltriphenylamine

Compound 4

To a solution of 3.3 g (5 mmol) of 4,4'-bis(3-methylcarbazol-9-yl)-4"sec-butyltriphenylamine (Compound 3) in 100 mL of dichloromethane is added 1.78 g (10 mmol) of N-bromosuccinimide (NBS) dissolved in 10 mL of DMF at 0 degrees Celsius. After the addition, the reaction is stirred at room temperature for another hour. The reaction mixture is poured into 150 mL of methanol while being stirred. The crude product is collect by filtration as white solids. The product is purified by column chromatography on silica gel eluted with a mixture of toluene and hexane (3:7 in volume). 2.7 g of final product is obtained as white solids having a purity of 99.4% as determined by HPLC.

Reaction Scheme:

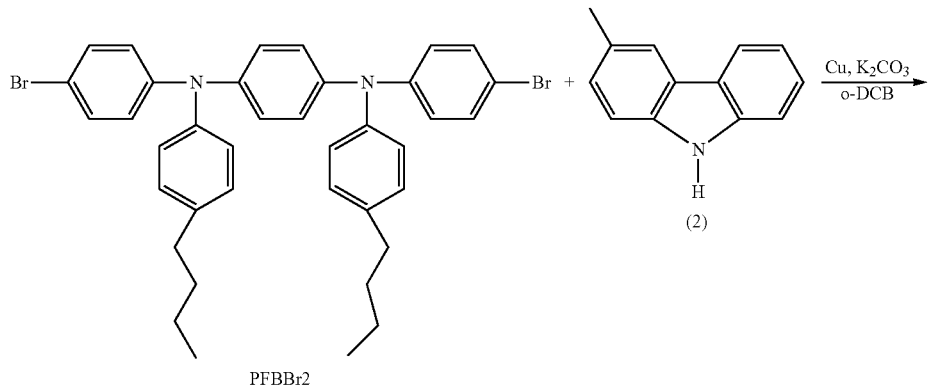

PFBBr2

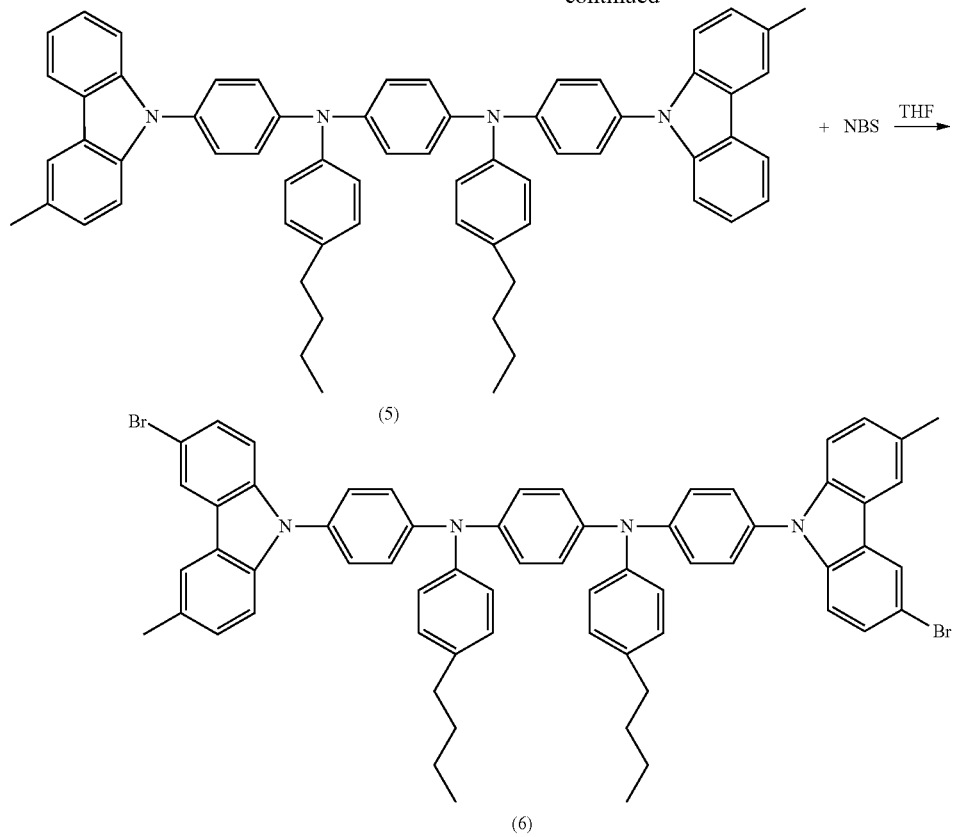

(5)

(6)

Synthesis of DCzPFB

Compound 5

10.24 g (15 mmol) of PFBBr2, 8.14 g of 3MCz, 7.1 g of copper, 30.4 g of potassium carbonate, 1.45 g of 18-crown-6 were dispersed in 250 ml of o-dichlorobenzene under nitrogen in a 500 ml of 3-neck RFB equipped with condenser and Dean-Stark trap. The suspension was degassed with flowed nitrogen for 15 min. and then was heated to reflux for 8 days. The reaction was allowed to cool to ~80° C. and was filtered through a basic alumina layer (~2 cm) and washed with toluene and THF. The combined solutions were evaporated to remove THF and toluene. The residue was poured into 300 ml of methanol to precipitate the product. The product was not in good solid state. The crude product was purified on silica gel eluted first with hexane to remove the head fractions and then with the mixture of hexane and toluene (95:5). It was found most of the product stayed at the top of the column as solids. Pure toluene was then used to elute the column. After the removal of the solvents, white solids were obtained. HPLC showed a purity of ~94%. The product was further purified by re-crystallization from iso-propanol and toluene to give the final product at the purity of 99.5% (HPLC). Yield: 7.1 g.

Synthesis of DCzPFBBr2

Compound 6

4.42 g (5 mmol) of DCzPFB (200401906-6) dissolved in ~200 ml of THF was added 1.80 g (10.1 mmol) of NBS in ~10 ml of DMF at rt. After the addition of NBS, the reaction was stirred at rt for overnight. After most of the solvent was removed on a rotary evaporator, the reaction mixture was poured into 200 ml of methanol to prepcipitate the product. The crude product was collected by filtration and washed with methanol. The crude product was recrystallized from xylenes three times to give the final product at the purity of 99.1% (HPLC). Yield: 2.7 g.

Preparation of Polymer 1

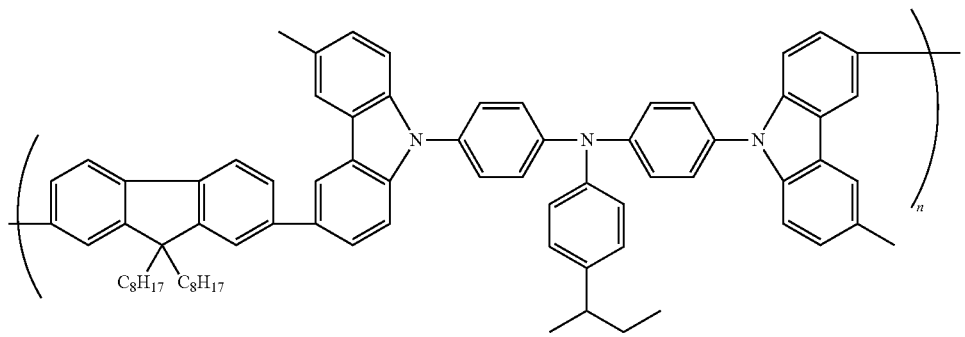

Figure 2:
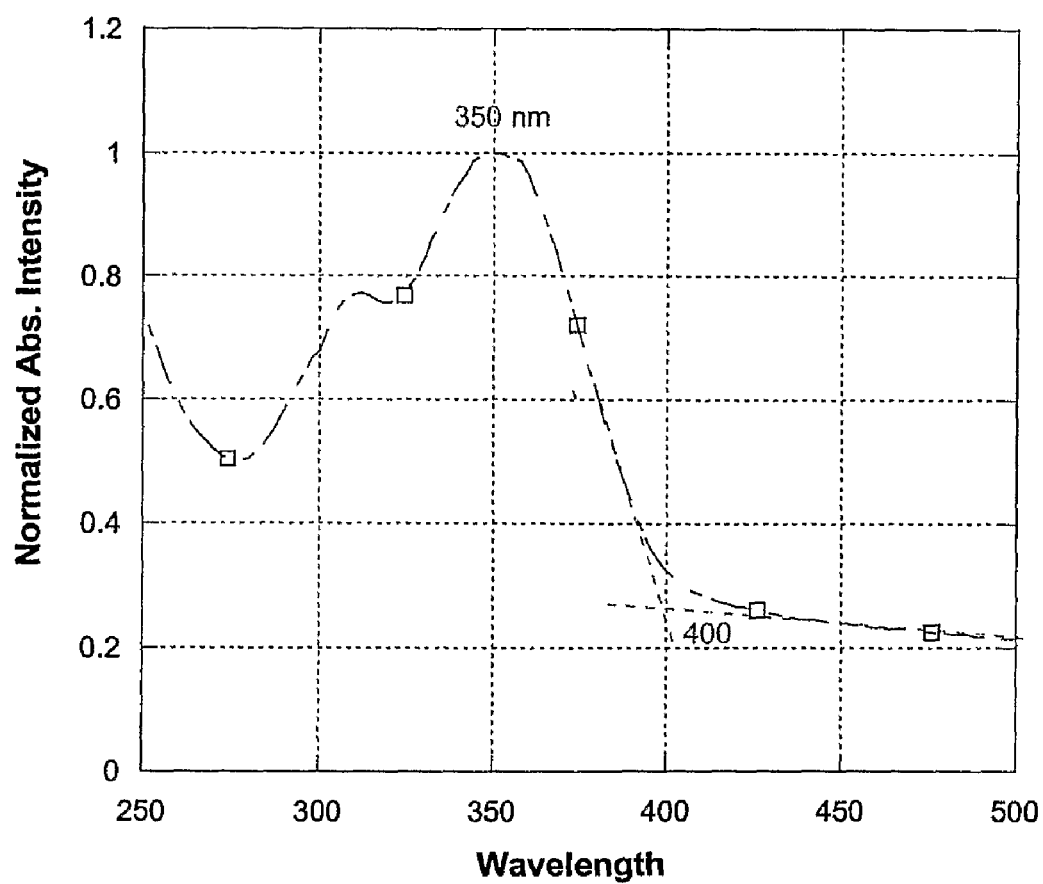
FIG. 2 shows the UV-visible absorption spectrum of Polymer 1.

2,7-Bis(1,3,2-dioxaborolan-2-yl)-9,9-dioctylfluorene (1.061 g, 2.0 mmol), 4,4'-bis(3-bromo-6-methylcarbazol-9-yl)-4"-sec-butyltriphenylamine (Compound 4) (1.635 g, 2.0 mmol), and trans-dichloro-bis(triphenylphosphine)palladium (II) (2.0 mg) are dissolved in toluene (25 mL) with stirring in a 250 mL 3-necked flask at room temperature. The reaction mixture is then heated to reflux, whereupon sodium carbonate (2 M, 7 mL) is added. The reaction mixture is then heated to reflux for about 2 days. Phenylboronic acid (0.2 g) is added followed by toluene (20 mL), and the reaction mixture is stirred and heated at 101 degrees Celsius for 5 hours. An aqueous solution of sodium diethyldithiocarbamate trihydrate (DDC, 3 g dissolved in 30 mL water) is then added and the mixture is stirred under nitrogen at 85 degrees Celsius overnight. The aqueous phase (16 mL) is separated from the polymer solution, and the organic solution is washed with 2 percent v/v aqueous acetic acid (2x~100 mL), followed by water washings (3x~100 mL). The organic phase containing the polymer product is passed through a column of celite (1"), silica (3"), and alumina (1") and eluted with toluene. The polymer fractions are combined and the solution is concentrated in vacuo to produce about a 3 percent w/v solution of the polymer in toluene. The product is precipitated in methanol. The polymer is dried overnight in vacuo at 60° C. The polymer is re-dissolved in toluene (170 mL), and then reprecipitated in methanol. The polymer is collected and dried in vacuo at 55 degrees Celsius overnight to yield 1.62 g of white fibers as the final polymer. GPC analysis of the polymer shows a number average molecular weight ($M_n$) of 25,900 and a weight average molecular weight ($M_w$) of 82,600 and a polydispersity ($M_w/M_n$) of 3.19. The cyclic voltammogram of this polymer is shown in FIG. 1. The highest occupied molecular orbital (HOMO) level of the polymer estimated from the onset oxidation potential is −5.2 eV. Such a shallow HOMO energy level indicates ease of hole-injection if the composition is used in a light-emitting polymer. An UV-visible absorption spectrum of the polymer in film state on quartz substrate taken at room temperature is shown in FIG. 2. The maximum absorption appears at 350 nm and the absorption onset is measured at 400 nm, from which optical HOMO-LUMO bandgap of the polymer is estimated as 3.10 eV—a large bandgap enabling deep blue emission.

Preparation of Polymer 2—Blue Light-emitting Polymer

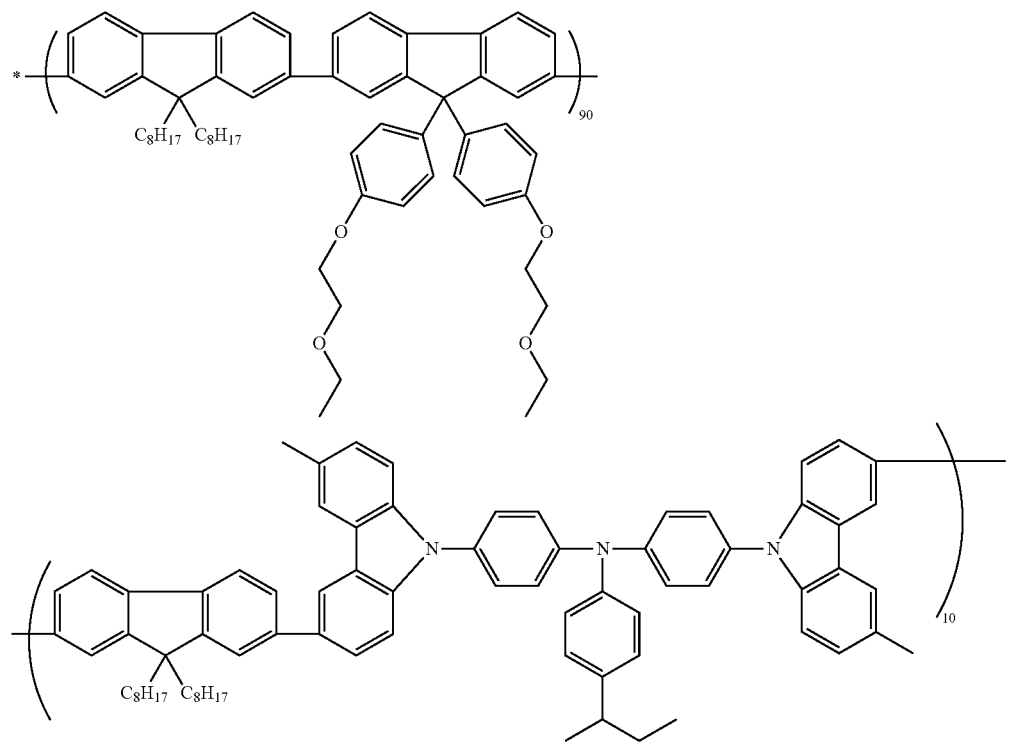

2,7-Bis(1,3,2-dioxaborolan-2-yl)-9,9-dioctylfluorene (2.652 g, 5.0 mmol), 2,7-dibromo-9,9-bis(4-(2-ethoxyethoxy)phenyl)fluorene (2.935 g, 4.50 mmol), 4,4'-Bis(3-methylcarbazol-9-yl)-4"-sec-butyltriphenylamine (Compound 3) (0.409 g, 0.50 mmol), Aliquat™ 336 phase transfer agent (0.6 g), and trans-dichloro-bis (triphenylphosphine)palladium (II) (3 mg) are dissolved in toluene (40 mL) with stirring in a 250 mL 3-necked flask at room temperature. The reaction mixture is then heated to reflux, whereupon sodium carbonate (2 M, 13 mL) is added. The mixture is stirred for about 2.5 hours, then phenylboronic acid is added (0.25 g) followed by toluene (40 mL), and the reaction mixture is stirred and heated overnight, then allowed to cool. An aqueous solution of sodium diethyldithiocarbamate trihydrate (DDC, 3 g dissolved in 30 mL water) is added and the mixture is heated and stirred under nitrogen at 95 degrees Celsius for 6 hours. The aqueous phase is separated from the polymer solution, and the solution is washed with 2 percent v/v aqueous acetic acid (3x~300 mL), followed by a water washing (300 mL). The polymer solution is poured into stirred methanol (3 L) to precipitate the polymer. The polymer is collected by filtration and dried in vacuum oven at 60 degrees Celsius overnight. The polymer is re-dissolved in 300 mL of toluene and the solution is passed through a column of celite (1"), silica (3"), and alumina (1") and eluted with toluene. The polymer fractions are combined and the solution concentrated in vacuo to produce about a 3 percent w/v solution of polymer in toluene. The product is precipitated in methanol. The polymer is dried overnight in vacuo at 60 degrees Celsius. The polymer is re-dissolved in toluene (200 mL), and then re-precipitated in methanol. The polymer is collected and dried in vacuo as above to yield 3.6 g of the final polymer as white fibers. GPC analysis of the polymer shows a number average molecular weight ($M_n$) of 93,900 and a weight average molecular weight ($M_w$) of 337,700.

Blue Polymer 2 LED Devices 85 mg of Polymer 2 are dissolved in xylenes (5 mL) and the solution is filtered through a 0.22 micrometer syringe filter. An 80 nm film of 1:16 w/w polyethylenedioxythiophene (PEDOT):polystyrene sulfonic acid (PSS) is deposited on a cleaned indium-tin-oxide (ITO) coated glass substrate and baked at 200° C. for 15 minutes. An 80 nm film of the polymer is spin-coated onto the PEDOT:PSS film from the polymer/xylenes solution and the coated substrate is baked at 130° C. under nitrogen for 1 hour. The cathode metals LiF (3 nm), Ca (10 nm), and Al (150 nm) are then vacuum deposited over the polymer film. The resultant device emits deep blue light (CIE coordinates x=0.17; y=0.10) under dc voltage driving, and gives an average brightness of 200 cd/m² at 3.91 volts with an average light efficiency of 1.67 cd/A. At 10 V, the average brightness is measured to be 3450 cd/m².

Figure 3:
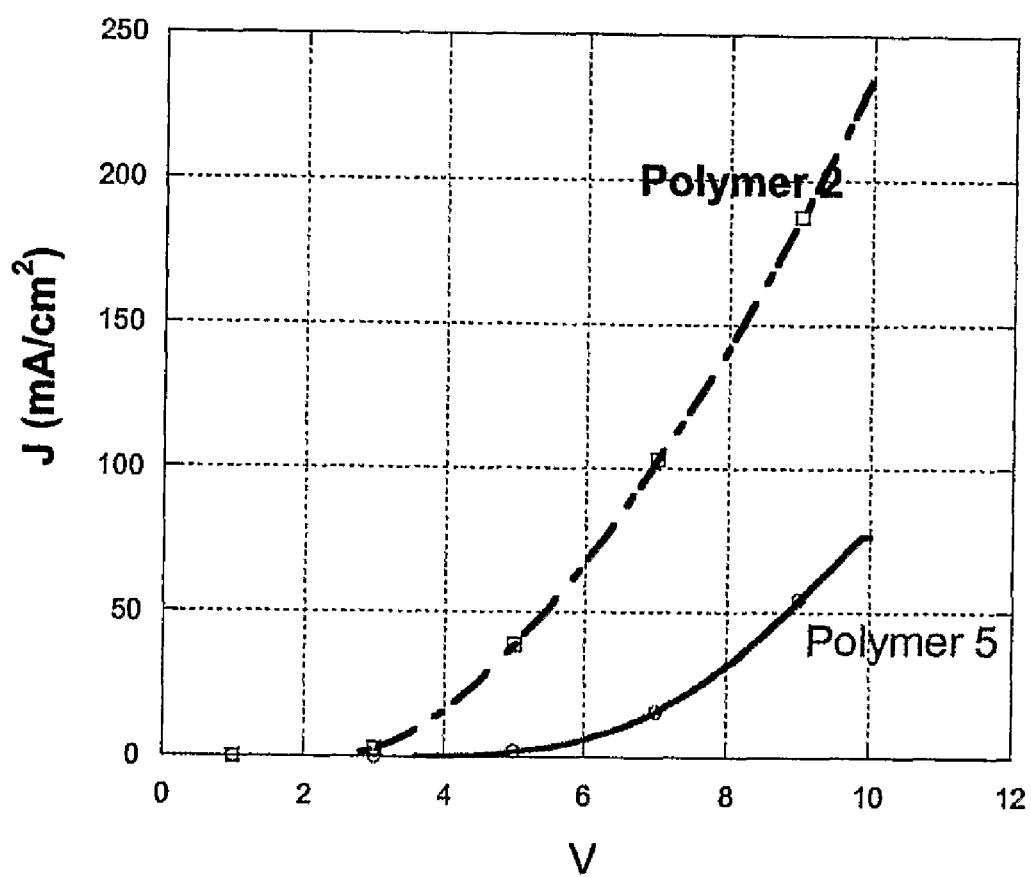
FIG. 3 shows the current density curves of Polymer 2 and Polymer 5.

Polymer 2 was compared with a similar polymer, Polymer 5, made from a tricyclic aryl amine, N-(4-n-butylphenyl)phenoxazine (POZ), rather than a biscarbazol-9-yl-substituted triarylamine. It has been demonstrated that the polymers comprising POZ in a repeat unit are more conductive compared to polymers made from other triaryl amines as disclosed in US 2004 0127666. The current density curves of the two polymers in device of ITO/Baytron P (80 nm)/LEP (80 nm)/Ba (5 nm)/Al (150 nm) are compared in FIG. 3. Polymer 2 exhibited significantly higher conductivity than Polymer 5.

The typical EL performance data of these two polymers in the device of ITO/Baytron P (80 nm)/LEP (80 nm)/Ba (5 nm)/Al (150 nm) are compared in Table 1. The data presented in Table 1 demonstrate that Polymer 2 comprising a biscarbazol-9-yl-substituted triarylamine may emit blue light in much deeper color with a lower driving voltage compared to Polymer 5 which comprises POZ as the amine.

TABLE 1

| Polymers | Voltage @ 200 Cd/m² (V) | Luminance Efficiency @ 200 Cd/m² (Cd/A) | Color Coordinates CIE (1931) (x, y) | Maximum Brightness @ 10 V (Cd/m²) |
|---|---|---|---|---|
| Polymer 2 | 4.7 | 1.67 | (0.16, 0.10) | 2884 |
| Polymer 5 | 5.5 | 5.77 | (0.16, 0.30) | 3328 |

Use of Polymer 1 as Interlayer Material in Blue LED Devices 25 mg of Polymer 1 are dissolved in xylenes (5 mL) and the solution is filtered through a 0.22 micrometer syringe filter. An 80 nm film of 1:16 w/w polyethylenedioxythiophene (PEDOT):polystyrene sulfonic acid (PSS) is deposited on a cleaned indium-tin-oxide (ITO) coated glass substrate and baked at 200° C. for 15 minutes. A ~10 nm film of the Polymer 1 is spin-coated onto the PEDOT:PSS film from the polymer/xylenes solution and the coated substrate is baked at 200° C. in nitrogen for 15 minutes. A ~80 nm film of blue light-emitting Polymer BP 209 is spin-coated onto the film of Polymer 1 from a xylenes solution and the coated substrate was baked at 130° C. under nitrogen for 1 hour.

The cathode metals Ba (5 nm) and Al (150 nm) are then vacuum deposited over the polymer film. The resultant device emits blue light (CIE coordinates x=0.16; y=0.30) under dc voltage driving.

Figure 4:
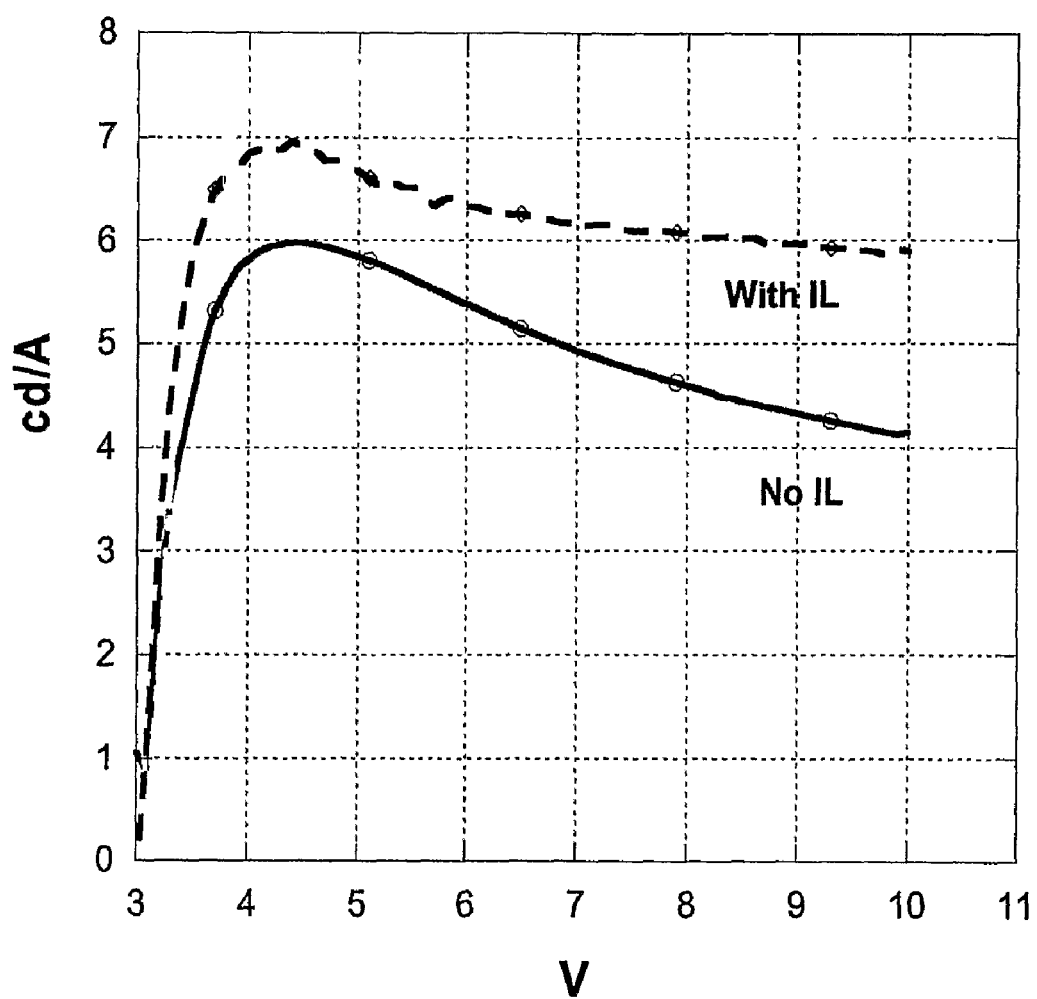
FIG. 4 shows the luminance efficiencies of the devices with and without Polymer 1 interlayer.

The luminance efficiencies of the devices with and without interlayer are compared in FIG. 4.

Figure 5:
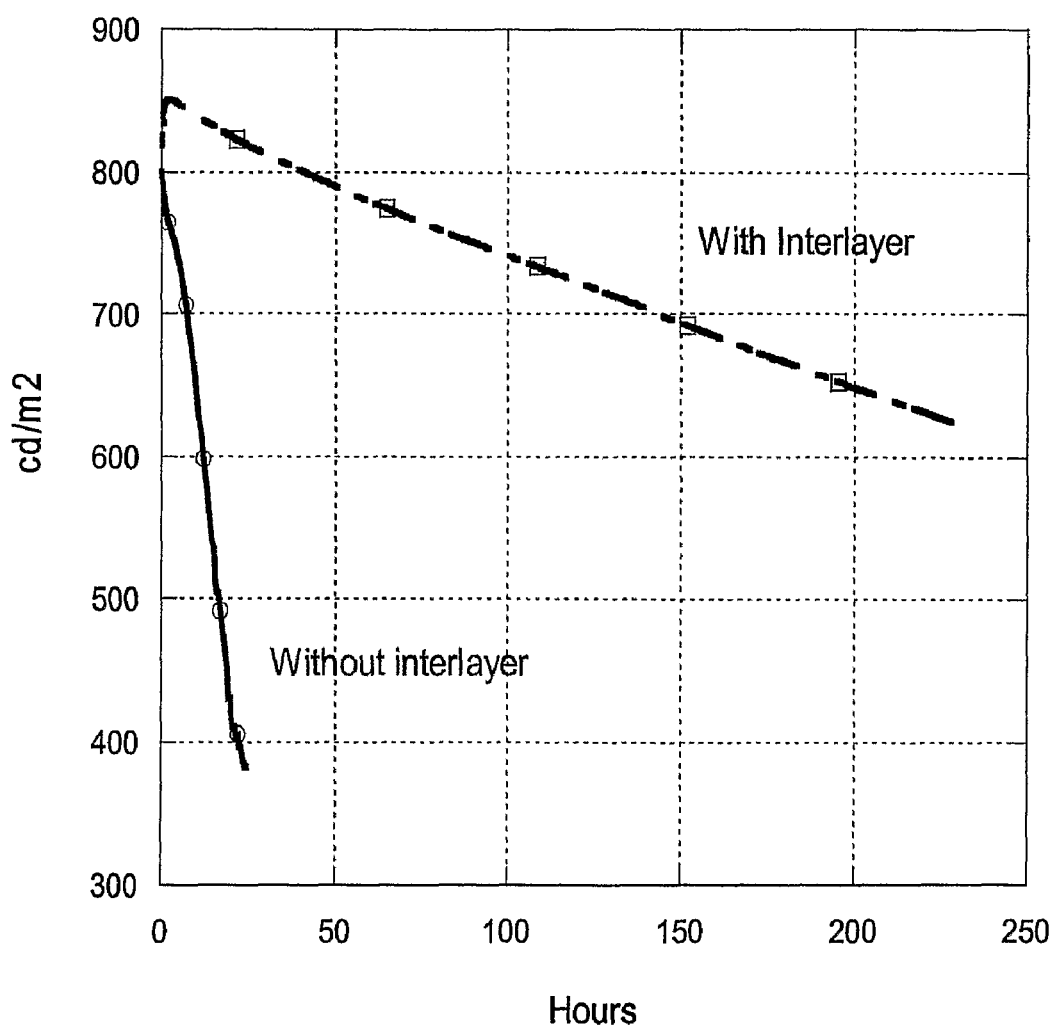
FIG. 5 shows the accelerated lifetimes of devices with and without Polymer 1 interlayer.

The addition of the interlayer increases the device efficiency. The accelerated lifetimes of the devices with and without Polymer 1 interlayer are shown in FIG. 5. The addition of the Polymer 1 interlayer dramatically improves the device lifetime.

Blue Polymer LED Devices Using a Blend of Polymer 1 with Poly(9,9-dioctylfluorene-2,7-yl) as Emissive Material 42.5 mg of Polymer 1 and 42.5 mg of poly(9,9-dioctylfluorene-2,7-yl) are dissolved in 5 mL of xylenes and then filtered through a 0.22 micrometer syringe filter. An 80 nm film of 1:16 w/w polyethylenedioxythiophene (PEDOT):polystyrene sulfonic acid (PSS) is deposited on a cleaned indium-tin-oxide (ITO) coated glass substrate and baked at 200° C. for 15 minutes. An 80 nm film of the blended polymers is spin-coated onto the PEDOT:PSS film from the polymer/xylenes solution and the coated substrate is baked at 130° C. under nitrogen for 1 hour. The cathode metals LiF (3 nm), Ca (10 nm), and Al (150 nm) are then vacuum deposited over the polymer film. The resultant device emits deep blue light (CIE coordinates x=0.16; y=0.08) under dc voltage driving, and gives an average brightness of 400 cd/m² at 5.8 volts with an average light efficiency of 1.2 cd/A. At 10 V, the average brightness is measured to be 1774 cd/m².

CONCLUSION

While this invention has been described as having preferred aspects, the instant invention can be further modified within the spirit and scope of this disclosure. This application is, therefore, intended to cover any variations, uses, or adaptations of the present invention using the general principles disclosed herein. Further, this application is intended to cover such departures from the present disclosure as come within the known or customary practice in the art to which this invention pertains and which fall within the limits of the appended claims.

The invention claimed is:

1. A conjugated or partially conjugated polymer comprising a structural unit of Formula III:

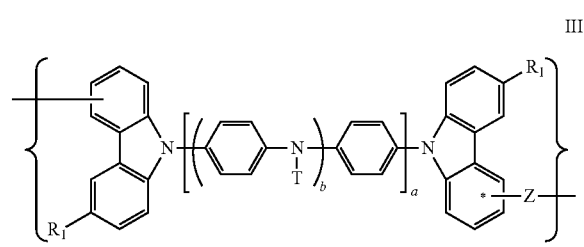

wherein T is an aryl or heteroaryl group that may be substituted or unsubstituted, or a C1-C24 alkyl group; $R_1$ is alkyl, alkoxy, aryl group, cyano, or F; and a and b are independently selected from 1, 2 or 3, where Z is an aromatic group or a combination of two or more aromatic groups independently selected from the group of formulas:

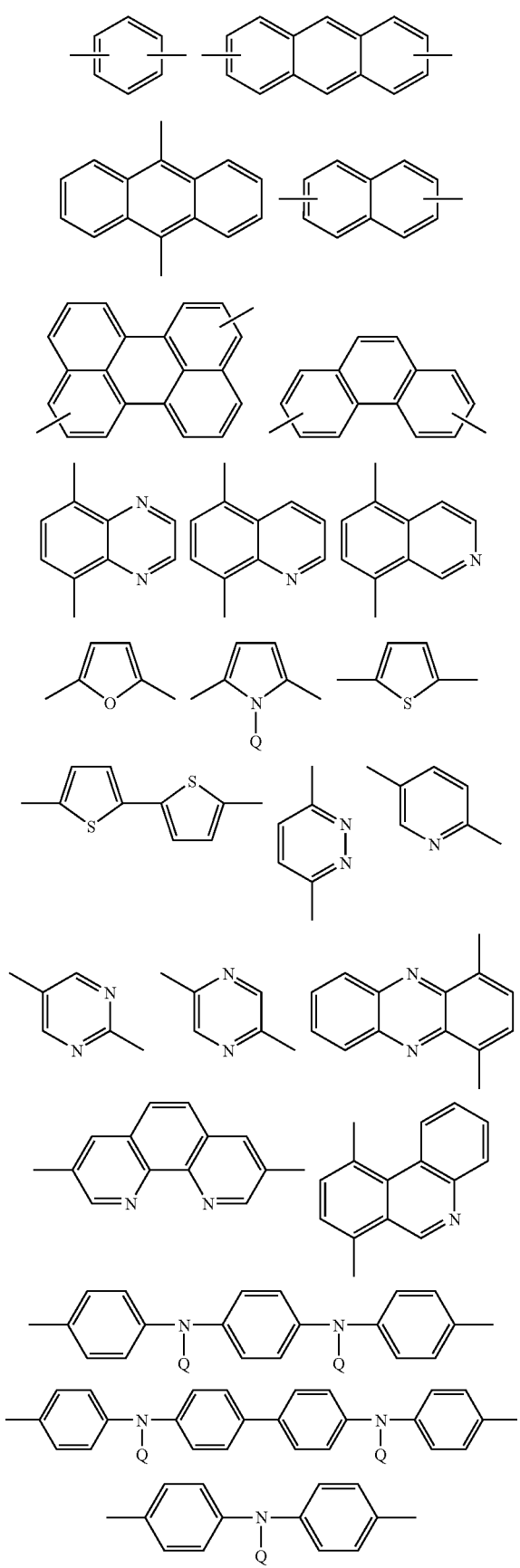
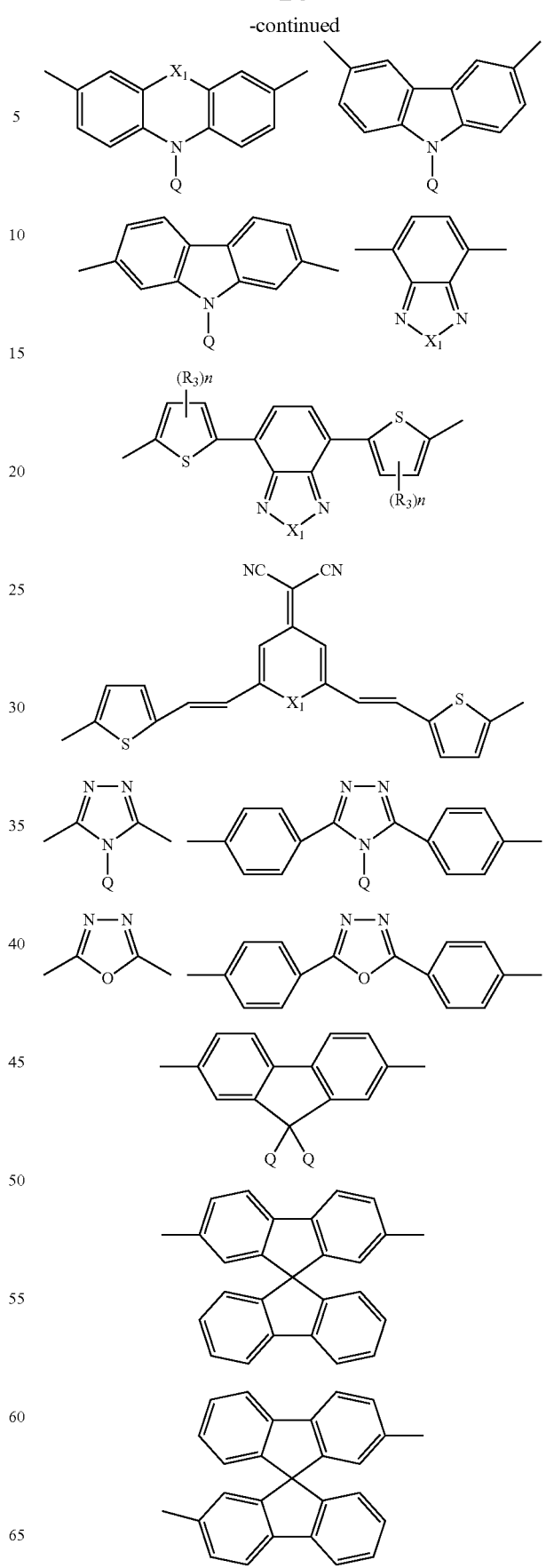

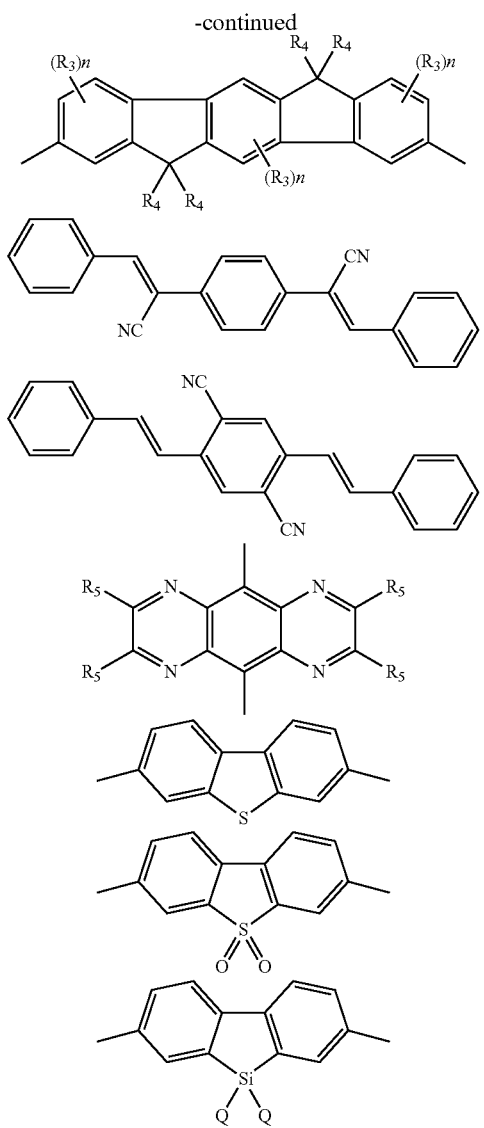

wherein the conjugated units may bear one or more substitutents, such substituents being independently, in each occurrence, $C_{1-20}$ hydrocarbyl, $C_{1-20}$ hydrocarboxyloxy, $C_{1-20}$ thioether, $C_{1-20}$ hydrocarbyloxycarbonyl, $C_{1-20}$ hydrocarboxycarbonyloxy, cyano, or fluoro group;

$X_1$ is O or S;

Q is $R_2$ or Ar;

Ar is an aryl or heteroaryl group of $C_4$ to $C_{40}$ or substituted aryl or heteroaryl group of $C_4$ to $C_{40}$; $R_2$ is independently, in each occurrence, H, $C_{1-40}$ hydrocarbyl or $C_{3-40}$ hydrocarbyl containing one or more S, N, O, P or Si atoms, or both of $R_2$ together with the 9-carbon on the fluorene may form a $C_{5-20}$ ring structure that may contain one or more S, N, Si, P or O atoms; $R_3$ is independently, in each occurrence, $C_{1-20}$ hydrocarbyl, $C_{1-20}$ hydrocarbyloxy, $C_{1-20}$ thioether, $C_{1-20}$ hydrocarbyloxycarbonyl, $C_{1-20}$ hydrocarbylcarbonyloxy, cyano or fluoro group; $R_4$ is independently, in each occurrence, H, $C_{1-40}$ hydrocarbyl or $C_{3-40}$ hydrocarbyl containing one or more S, N, O, P or Si atoms, or both of $R_4$ together with the 9-carbon on the fluorene may form a $C_{5-20}$ ring structure that may contain one or more S, N, Si, P or O atoms; $R_5$ is independently, in each occurrence, H, $C_{1-40}$ hydrocarbyl or $C_{3-40}$ hydrocarbyl containing one or more S, N, O, P or Si atoms;

n is independently in each occurrence, 0-3.

2. The polymer of claim 1, wherein T is an alkyl group, or an aromatic group which may contain one or more heteroatoms, which groups may be fused by one or more aromatic or non-aromatic rings, and which groups may be substituted or unsubstituted.

3. The polymer of claim 1, wherein T is an aromatic moiety selected from the group consisting of phenyl, biphenyl, fluorenyl, thiophenyl, furanyl, pyrrolyl, pyridinyl, naphthalenyl, anthracenyl, phenanthrenyl, tetracenyl, perylenyl, quinolinyl, isoquinolinyl, quinazolinyl, phenanthridenyl, phenanthrolinyl, phenazinyl, acridinyl, dibenzosilolyl, phthalazinyl, cinnolinyl, quinoxalinyl, benzoxazolyl, benzimidazolyl, benzothiophenyl, benzothiazolyl, carbazolyl, benzoxadiazolyl, benzothiadiazolyl, thieno[3,4-b]pyrazinyl, [1,2,5]thiadiazolo[3,4-g]-quinoxalinyl, benzo[1,2-c;3-4-c']bis[1,2,5]-thiadiazolyl, pyrazino[2,3-g]quinoxalinyl, benzofuranyl, indolyl, dibenzofuranyl, dibenzothiophenyl, thianthrenyl, benzodioxinyl, benzodioxanyl, dibenzodioxinyl, phenazinyl, phenoxathiinyl, benzodithiinyl, benzodioxolyl, benzocyclobutenyl, dihydrobenzodithiinyl, dihydrothienodioxinyl, chromanyl, isochromanyl, 9,10-dihydrophenanthrenyl, thiazinyl, phenoxazinyl, isoindolyl, dibenzothiophenesulfonyl, and phenothiazinyl.

4. The polymer of claim 1, wherein T is a substituted or unsubstituted phenyl, biphenyl, fluorenyl, carbazolyl, phenoxazinyl, or phenothiazinyl.

5. The polymer of claim 1, wherein T is a substituted phenyl.

6. The polymer of claim 1, wherein $R_1$ is methyl, n-butyl, or t-butyl; a and b are 1; T is p-tolyl, 4-butylphenyl, 4-sec-butylphenyl, or 4-methoxypheyl.

7. The polymer of claim 1, wherein $R_1$ is methyl, n-butyl, or t-butyl; a is 1 and b is 2; T is p-tolyl, 4-butylphenyl, 4-sec-butylphenyl, or 4-methoxyphenyl.

8. The polymer of claim 1, wherein $R_1$ is independently alkyl, alkoxyl, aryl group, cyano, or F.

9. The polymer of claim 1, wherein $R_1$ is a $C_1$-$C_{20}$ alkyl group, a carbo-$C_1$-$C_{20}$-alkoxy group, a $C_1$-$C_{20}$-alkoxy group, which optionally contains one or more heteroatoms, such as O, S, N, Si, and in which one or more hydrogen atoms may be replaced by F, or aromatic groups, or a $C_6$-$C_{40}$ aryl group may be substituted and which may contain one or more heteroatoms.

10. The polymer of claim 1, wherein $R_1$ is methyl, ethyl, propyl, butyl, methoxy, ethoxy, propoxy, butoxy, phenyl, or tolyl.

11. The polymer of Claim 1, wherein Z has the formula

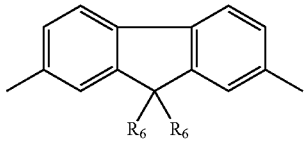

where $R_6$ is independently $C_4$-$C_{20}$-alkyl, $C_4$-$C_{20}$-alkoxy, $C_7$-$C_{20}$-alkylphenyl, $C_7$-$C_{20}$-alkyloxyphenyl, or $C_6$-$C_{40}$-aryl. Both of $R_6$ together with the 9-carbon on the fluorene may form a $C_{5-20}$ ring structure that may contain one or more S, N, Si, P or O atoms.

12. The polymer of claim 11, wherein $R_6$ has the formula

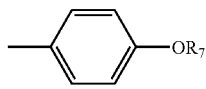

where $R_7$ is a $C_1$-$C_{20}$ alkyl group optionally containing one or more heteroatoms.

13. The polymer of claim 1, further comprising a solvent.

14. A film comprising the polymer of claim 1.

15. A composition comprising the polymer of claim 1 blended with at least one additional polymer.

16. A composition comprising the polymer of claim 1 blended with at least one additional conjugated or partially conjugated polymer.

17. The polymer of claim 1 wherein the polymer emits light in the blue range of the spectrum.

18. An electroluminescent device comprising at least one organic film comprising the polymer of claim 1, arranged between an anode material and a cathode material such that under an applied voltage, the organic film emits blue light which is transmitted through a transparent exterior portion of the device.

19. A field effect transistor comprising:
(a) an insulator layer, the insulator layer being an electrical insulator, the insulator layer having a first side and a second side;
(b) a gate, the gate being an electrical conductor, the gate being positioned adjacent the first side of the insulator layer;
(c) a semiconductor layer, the semiconductor layer comprising the polymer of claim 1 and a second electrode;
(d) a source, the source being an electrical conductor, the source being in electrical contact with the first end of the semiconductor layer; and
(e) a drain, the drain being an electrical conductor, the drain being in electrical contact with the second end of the semiconductor layer.

20. A photocell comprising a first electrode, a film comprising the polymer of claim 1 and a second electrode.

21. A compound of Formula IV

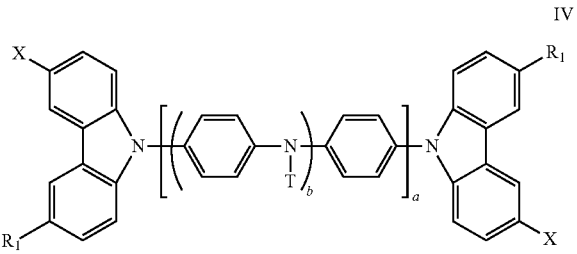

wherein T is an aryl or heteroaryl group that may be substituted or unsubstituted, or a C1-C24 alkyl group; $R_1$ is alkyl, alkoxy, aryl group, cyano, or F; a and b are independently selected from 1, 2 or 3; and X is a halogen or a boronate group.

22. The compound of claim 21, wherein X is bromine.

23. The compound of claim 21, wherein X is bromine; $R_1$ is methyl, n-butyl, or t-butyl; a and b are 1; T is p-tolyl, 4-butylphenyl, 4-sec-butylphenyl, or 4-methoxyphenyl.

24. The compound of claim 21, wherein X is bromine, $R_1$ is methyl, n-butyl, or t-butyl; a is 1 and b is 2; T is p-tolyl, 4-butylphenyl, 4-sec-butylphenyl, or 4-methoxyphenyl.

* * * * *